Figure 1:
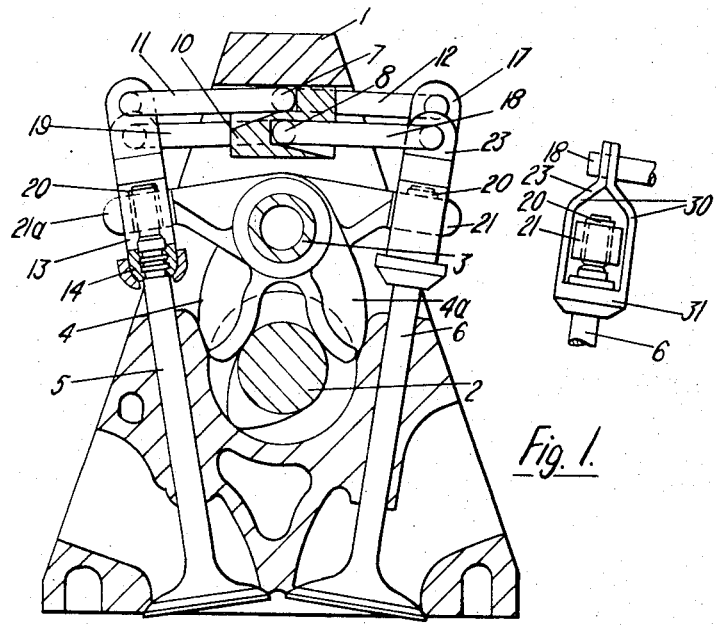

Dec. 19, 1967  U. RENGER  3,358,659
INTERNAL COMBUSTION ENGINE VALVE GEAR
Filed July 11, 1966  2 Sheets-Sheet 1

Inventor
Udo Renger
BY
F. J. Outland
Attorney

Dec. 19, 1967 U. RENGER 3,358,659
INTERNAL COMBUSTION ENGINE VALVE GEAR
Filed July 11, 1966 2 Sheets-Sheet 2
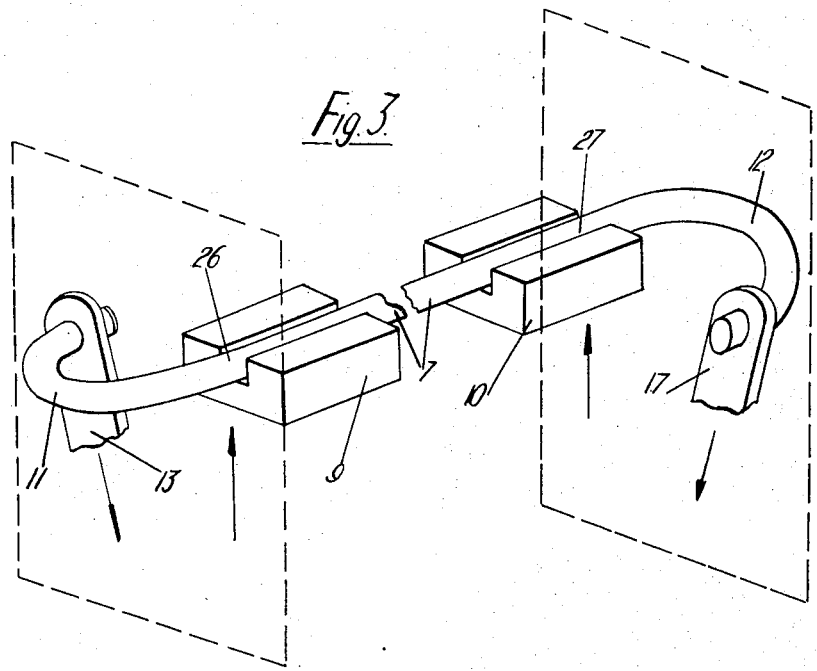
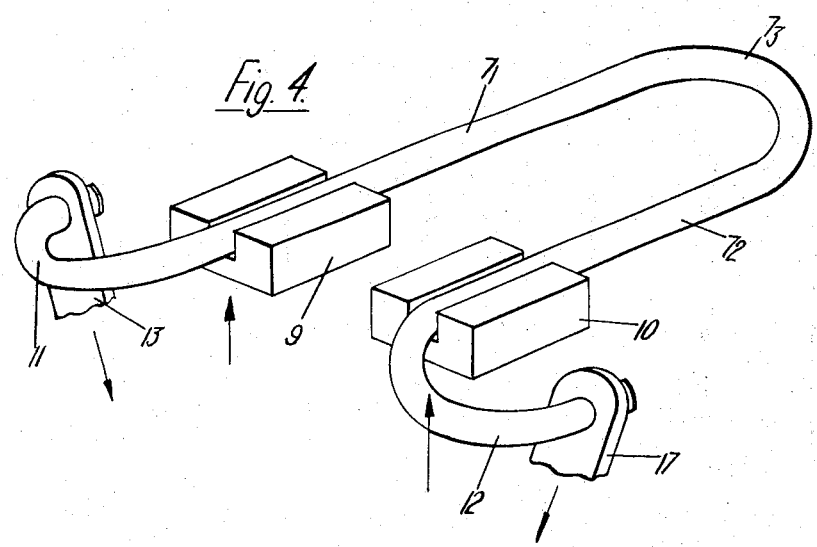
Inventor
BY *Udo Renger*
*R. J. Outland*
Attorney

United States Patent Office 3,358,659
Patented Dec. 19, 1967

3,358,659
INTERNAL COMBUSTION ENGINE VALVE GEAR
Udo Renger, Mainz, Germany, assignor to General Motors Corporation, Detroit, Mich., a corporation of Delaware
Filed July 11, 1966, Ser. No. 564,119
Claims priority, application Germany, July 17, 1965, O 10,996
5 Claims. (Cl. 123—90)

This invention relates to a valve gear for internal combustion engines, particularly for high-speed motor vehicle engines, having valve-closing torsion bar springs.

In known valve gears for high-speed internal combustion engines in which torsion springs are used for returning the valves instead of helical springs arranged on the valve stem a straight metal bar firmly clamped in the cylinder head is used as a torsion spring for the valve gear. The closing of the valve is brought about by means of a forked lever which is secured at the other end of the metal bar in rotationally rigid manner by splines or the like.

Such devices are expensive and consequently are not entirely suitable for manufacture by mass production methods.

According to the invention, in an internal combustion engine valve gear using torsion bar springs, the torsion bar spring consists of a straight portion and at least one arcuate portion, the latter being formed by arcuately bending the straight portion and acting as a lever arm directly on a valve.

Owing to the arcuate bend, stress peaks in the spring are avoided particularly at the inner fibres of the arcuate portion. Moreover, the spring characteristic may be easily varied by altering the bow shape or the length of the bend. Furthermore, since the lever arm acting as a spring element is subject to deformation, the designer is offered a diversity of possibilities of easy adaptation to the constructional conditions. Appropriately the bend is of semi-circular shape.

According to a further feature of the invention, the torque of the spring is taken up by arcuately bending the straight portion of the torsion bar spring so as to form lever arms, the torque initiated at one end when a valve is opened, being taken up by supporting the other end against the cylinder head or against another adjacent valve. In this form, the spring is no longer clamped but is merely supported.

According to a further feature of the invention, the straight setcion of the torsion bar spring is rotatably supported at the extremities in two bearings arranged in the cylinder head and stressed under compression. These bearings may remain upwardly open. They may also be integral with the cylinder head. By virtue of this arrangement, firm clamping of the torsion bar spring, with all its consequent disadvantages, is avoided and is replaced by a simple support only. Moreover, a single spring may actuate two valves.

In order to eliminate bending stress in the torsion bar or reduce such stress to a minimum, the straight section of the torsion bar spring is, according to a further feature of the invention, supported at its extremities and the valve forces initiated at the outer ends of the arcuate portions act in transverse planes running approximately perpendicular to the torsion bar and through the supporting points of the straight section of the spring In order to ensure sufficient closing force, even when the valve is in the closed position, the torsion bar spring is fitted in position under initial stress which is such that the lever arms produce a resilient restoring movement of the valves.

Further features of the invention will be apparent from the following description and claims.

Figure 2:
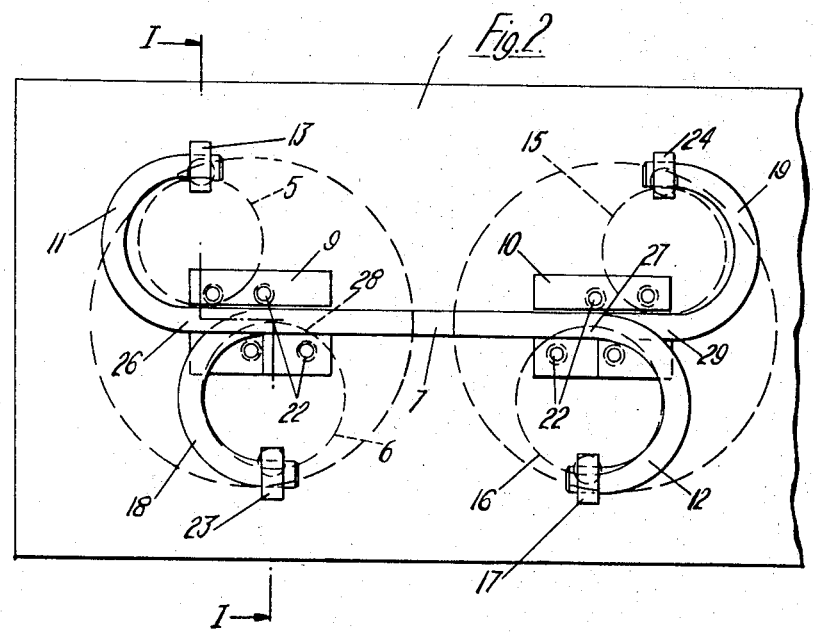

The invention is hereinafter particularly described with reference to the accompanying drawings in which:

FIG. 1 shows a preferred arrangement of the valve gear according to the invention, partly in section along line I—I of FIG. 2, FIG. 2 is a plan of a portion of the preferred arrangement of the valve gear according to the invention, FIG. 3 shows a spring from FIGS. 1 and 2 in perspective and indicates, the forces acting at the valve and bearings, and FIG. 4 shows in perspective a further embodiment of the torsion bar spring for the valve gear according to the invention.

FIGURE 1 shows a camshaft 2 mounted in the cylinder head 1 of an internal combustion engine. Arranged parallel with the camshaft 2, is a hollow rocker shaft 3 upon which the rockers 4, 4a are rotatably mounted. An arm 21 of rocker 4 acts on an exhaust valve 6, and an arm 21a of rocker 4a on the admission valve 5 of the first cylinder of the internal combustion engine. The rocker arms 21, 21a are provided with threaded bores into which the adjusting screws 20 are introduced. Adjustment of the valve clearance is brought about in the conventional manner by rotating the adjusting screws 20. The valve springs 7 and 8 consist of a straight portion stressed exclusively under torsion, and respective end portions 11, 12 and 18, 19 bent into a semicircle. At their extremities 26, 27; 28, 29, the respective straight portions of the springs 7, 8 rest in two bearings 9, 10 secured in the cylinder head 1 by means of screws 22. The bearings 9, 10 may also be cast integrally with the cylinder head 1. The upper valve spring 7 acts on the admission valve 5 of the first cylinder on the one hand, and on the exhaust valves 16 of the adjacent second cylinder, on the other hand. Similarly, the bottom spring 8 acts on the exhaust valve 6 of the first cylinder and the admission valve 15 of the second cylinder. The semicircular arm 11 of spring 7 is connected to the admission valve 5 of the first cylinder of the engine by means of a connecting member 13 and key members 14, whilst arm 12 is mounted in the connecting member 17 of the exhaust valve 16 of the second cylinder, under initial stress. Consequently when in the fitted condition, spring 7 is under tension, so that the valves 5, 16 are always drawn upwards into the closing position by the arms 11, 12 through the connecting members 13, 17.

Similarly, the spring 8 acts upon valves 6, 15 through its lever arms 18, 19 and connecting members 23, 24. The extent of the closing forces depends upon the degree of initial stress and this in turn depends on the amount of necessary rotation of the torsion bar in order to bring its lever arms into the intended position.

The upper spring 7 of FIGS. 1 and 2 is again illustrated in perspective in FIG. 3, this also indicating the planes in which the valve forces are effective. At the extremities 26, 27 of the straight portion of spring 7, these are transverse planes running perpendicular to the torsion bar.

The connecting members 23, 24, 13, 17 consist each of two flat links 30, which are brought together into fork-shape at their upper ends, whilst their lower ends are arcuately shaped in cross section and are welded on to a round collar 31. This collar 31 may either be a pressing or a lathe-turned part. By means of the keying member 14, the collar 31 grips firmly round the stem of valve 6. The upper end of connecting member 23 has therein a hole in which the end 18 of spring 8 engages under tension and is locked by suitable means.

The operation of the valve gear described is as follows:

When, under the influence of camshaft 2, the arm 21a of rocker 4a forces the admission valve 5 downwards in opposition to the closing effort of spring 7, valve 5 opens and carries the lever arm 11 of spring 7 downwards along with it, by means of connecting member 13. The result is that the torsional stress is increased in the straight portion of spring 7, which is prevented from turning due to the fact that its second arm 12 is supported at connecting member 17 of valve 16. During the opening action of valve 5, arm 12 exerts an increased upward effort, that it, in the closing direction of valve 16. The same mode of operation applies to spring 8 as illustrated, as well as to all other valve springs of the engine which are not shown.

The spring indicated in FIG. 4 is a modified form of the construction according to FIG. 3. Instead of being S-shaped as in FIG. 3, the valve spring 7 is now of hairpin shape. With this construction, its semicircular ends 11, 12 are in close proximity to each other and may therefore act on adjacent valves, e.g. on an admission valve and an exhaust valve of the same cylinder.

The connection between the spring 7 and the valves is effected by connecting members 13, 17 as in the embodiment according to FIG. 3.

The middle portion of the spring, stressed substantially under torsion, consists of two parallel limbs $7_1$, $7_2$ which are joined together by a connecting bow $7_3$ and are mounted in bearings 9, 10.

The valve forces and bearing forces act in a plane which is perpendicular to the plane of the two limbs. The torque initiated for example at end 11, is passed on through the entire length of the spring whilst elastically deforming same, and the thrust is taken up in the same manner as in the construction shown in FIG. 3.

I claim:

1. An internal combustion engine valve gear including an engine cylinder head, at least one pair of poppet valves the stems of which are slidably mounted in said head for reciprocation by said valve gear, each said pair of valves being arranged for actuation to its respective closed position by a single torsion bar spring, and each said spring comprising a straight portion each end of which is bent into the form of a semi-circularly shaped lever arm, a pair of bearings mounted on said cylinder head and respectively engaged by and compressively stressed by the ends of said straight portion, said lever arms being respectively directly engaged, under initial stress, with said pair of valves whereby the torque initiated at one end of a spring during the opening movement of a valve by a valve actuator mechanism mounted on said cylinder head is taken up by the other end thereof engaged with the other of said pair of valves.

2. An internal combustion engine valve gear according to claim 1, in which said straight portion is bent intermediate its ends into a semicircular arc separating said straight portion into two parallel sections whereby said spring ends are in relatively close longitudinal proximity to one another.

3. Valve gear for an internal combustion engine, said valve gear comprising:
a torsion bar spring formed from a unitary rod and having a straight portion and an arcuate lever arm portion at one end of said straight portion and
a poppet valve having a stem,
said lever arm portion being connected with said valve stem and said spring being restrained so as to torsionally deform said straight portion and thereby bias said valve in a closing direction.

4. Valve gear for an internal combustion engine, said valve gear comprising:
a torsion bar spring formed from a unitary rod and having a straight portion and an arcuate lever arm portion at each end of said straight portion, said lever arm portions extending to generally opposite sides of said straight portion,
a pair of spaced poppet valves each having a stem,
means connecting said valve stems to said spring lever arm portions and
means restraining said spring straight portion so as to torsionally deform said straight portion and bias said valves in their closing directions.

5. The combination of claim 4 wherein said restraining means comprise bearings unidirectionally supporting said spring straight portion adjacent the ends thereof and said spring lever arm portions are of semicircular configuration, said connecting means engaging said lever arms at points laterally outboard of said bearings whereby forces imposed by said connecting means on said lever arms act in transverse planes extending substantially perpendicular to said straight portion and through the supported portions of said straight portion ends.

References Cited

UNITED STATES PATENTS

| | | | |
|---|---|---|---|
| 1,302,556 | 5/1919 | Huber | 123—188 |
| 2,041,539 | 5/1936 | Gaultier. | |
| 2,100,057 | 11/1937 | Krebs | 267—1 |
| 2,398,207 | 4/1946 | Chilton | 267—1 |
| 2,534,621 | 12/1950 | Panhard | 267—1 |
| 2,906,543 | 9/1959 | Polhemus | 267—57 X |
| 2,915,321 | 12/1959 | Wilfert | 267—57 X |
| 3,037,789 | 6/1962 | Allison | 267—57 X |
| 3,097,633 | 7/1963 | Klein. | |

FOREIGN PATENTS

| | | |
|---|---|---|
| 659,049 | 4/1938 | Germany. |
| 703,801 | 3/1941 | Germany. |
| 581,714 | 10/1946 | Great Britain. |

AL LAWRENCE SMITH, *Primary Examiner.*